(12) United States Patent
Nomura et al.

(10) Patent No.: US 6,552,292 B1
(45) Date of Patent: Apr. 22, 2003

(54) METAL WELDING METHOD AND METAL BONDING STRUCTURE

(75) Inventors: Seiji Nomura, Hiroshima-ken (JP); Satoshi Nanba, Hiroshima-ken (JP); Yukihiro Sugimoto, Hiroshima-ken (JP); Yukio Yamamoto, Hiroshima-ken (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/497,193

(22) Filed: Feb. 3, 2000

(30) Foreign Application Priority Data

Mar. 15, 1999 (JP) .............................. 11-068937

(51) Int. Cl.[7] .............................................. B23K 11/00
(52) U.S. Cl. ................. 219/78.02; 219/78.01; 219/194; 219/148
(58) Field of Search ................. 219/78.02, 78.01, 219/148, 162; 29/888.06, 888.46, 888.44; 228/194, 196, 198

(56) References Cited

U.S. PATENT DOCUMENTS

| | | | |
|---|---|---|---|
| 3,644,698 A | * | 2/1972 | Metcalfe et al. ......... 219/117.1 |
| 4,046,305 A | * | 9/1977 | Brown et al. ................. 228/194 |
| 4,674,675 A | * | 6/1987 | Mietrach ...................... 228/194 |
| 4,771,537 A | * | 9/1988 | Pryor et al. ..................... 29/830 |
| 5,599,468 A | * | 2/1997 | Mako et al. .............. 29/888.46 |
| 5,742,020 A | * | 4/1998 | Adachi et al. ............ 219/78.01 |
| 5,761,806 A | * | 6/1998 | Adachi et al. ............ 29/888.46 |
| 5,802,716 A | * | 9/1998 | Nishimura et al. ....... 29/888.06 |
| 5,812,925 A | * | 9/1998 | Ecer ........................ 29/888.46 |
| 5,899,185 A | | 5/1999 | Ohtsubo |
| 5,955,754 A | * | 9/1999 | Azuma et al. ............... 228/194 |
| 6,027,957 A | * | 2/2000 | Merritt et al. ............... 228/194 |
| 6,186,390 B1 | * | 2/2001 | Tadauchi et al. ........... 228/56.3 |
| 6,194,087 B1 | * | 2/2001 | Huhn et al. .................. 428/646 |
| 6,222,150 B1 | * | 4/2001 | Nomura et al. .......... 219/78.02 |
| 6,323,458 B1 | * | 11/2001 | Nomura et al. ............. 219/148 |

FOREIGN PATENT DOCUMENTS

| | | |
|---|---|---|
| EP | 0 389 625 A1 | 10/1990 |
| EP | 0 705 960 A2 | 4/1996 |
| EP | 0 723 069 A1 | 7/1996 |
| EP | 0 914 897 A1 | 5/1999 |
| EP | 0914897 A1 * | 5/1999 |
| EP | 1044754 A1 * | 10/2000 |
| JP | 8-144723 | 6/1996 |
| JP | 8-296416 | 11/1996 |

\* cited by examiner

*Primary Examiner*—Tom Dunn
*Assistant Examiner*—L. Edmondson
(74) *Attorney, Agent, or Firm*—Nixon Peabody LLP; Donald R. Studebaker

(57) ABSTRACT

When a seat (3) (FIG. 6A) on which a wax layer (7) is formed via a melting reaction layer (5) is brought into contact with a head (2) and heated and pressed in this state, a melting reaction layer (6) forms below the wax layer (FIG. 6B). When electric current application and pressing are continued from this state, a wax which has not reacted in the wax layer (7) in the formation of the melting reaction layer (6) is discharged from between the melting reaction layers (5) and (6). When electrical current application and pressing are further continued from this state, the two melting reaction layers (5) and (6) diffuse each other. The result is that a ternary alloy bonding layer (10) containing Fe, Al, and Zn, which constitute the melting reaction layers (5) and (6) is formed between the seat (3) and the head (2) (FIG. 6D).

17 Claims, 15 Drawing Sheets

PRESSING AND ELECTRIC CURRENT APPLICATION

FIG. 5A
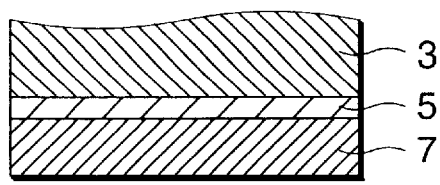
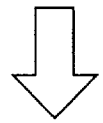
FIG. 5B
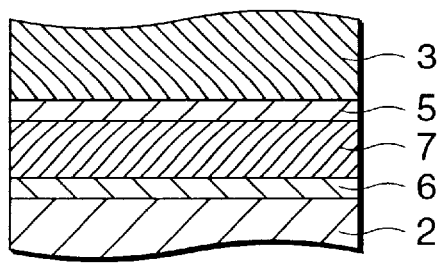
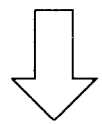
FIG. 5C
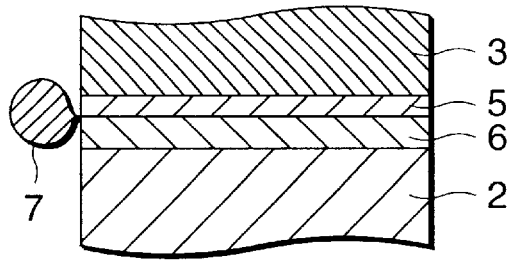
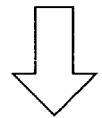
FIG. 5D
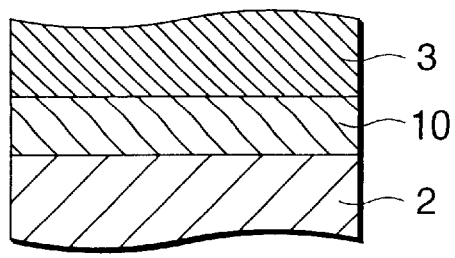

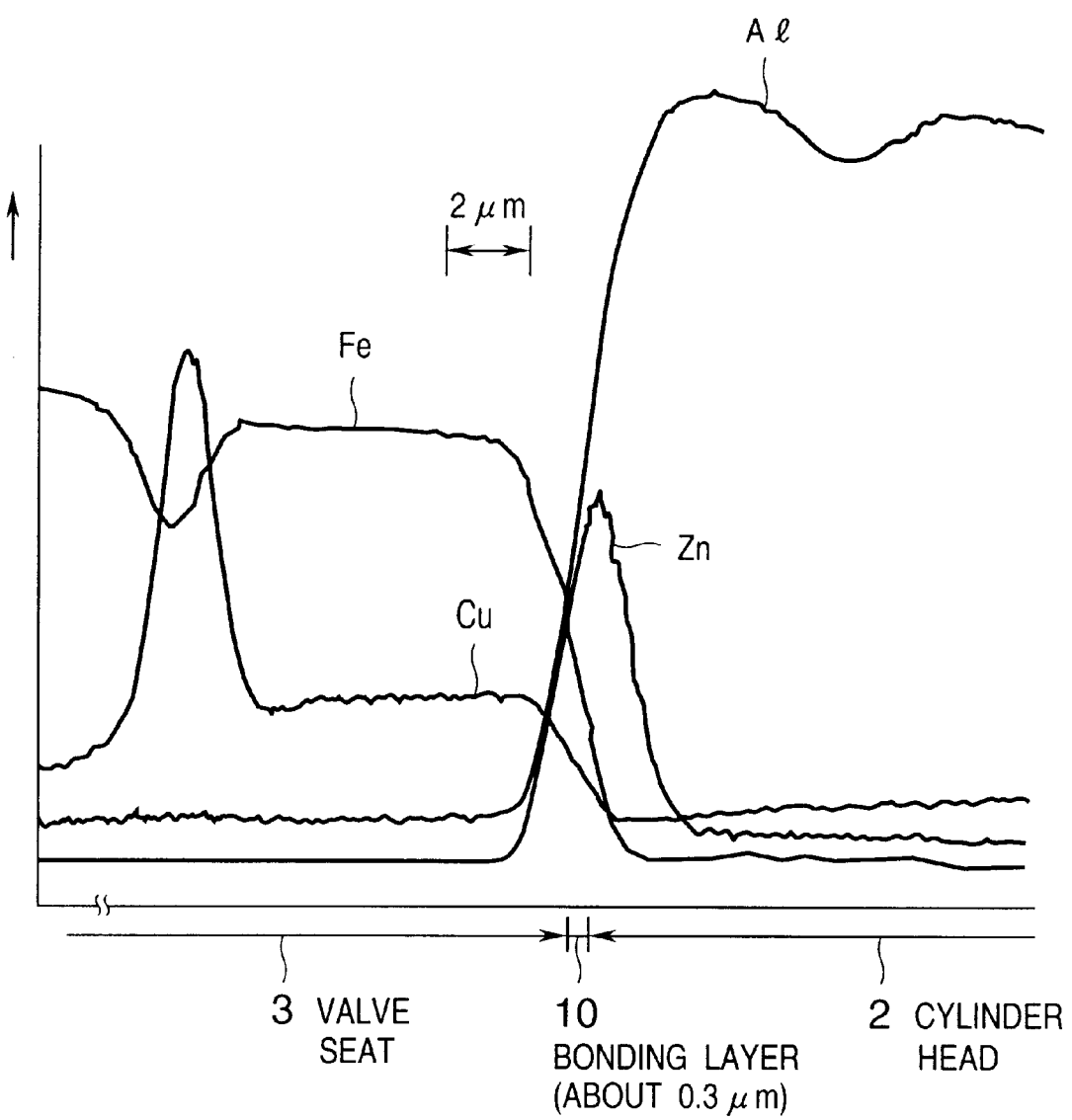

COOLING WATER

PRESSING AND ELECTRIC CURRENT APPLICATION

METAL WELDING METHOD AND METAL BONDING STRUCTURE

BACKGROUND OF THE INVENTION

1. Field of the Invention

The present invention relates to a metal welding method and metal bonding structure and, more specifically, a metal welding method and metal bonding structure by which different types of metals are bonded by, e.g., electrical resistance welding which heats and presses the metals.

2. Description of the Related Art

Conventionally, techniques which bond two different types of metals differing in, e.g., melting point by heating and pressing have been extensively used. The electrical resistance welding technique is one example of such metal bonding techniques. In this welding technique, different types of metals are brought into contact with each other and applied with an electric current and pressed in this contacted state. The two metal members are bonded by using the electrical resistance between the contact surfaces.

Japanese Patent Laid-Open No. 8-296416 has proposed a technique by which this electrical resistance welding technique is applied to bonding of a cylinder head and a valve seat. Compared to the conventional method of press fitting, this technique of bonding a cylinder head to a valve seat can decrease the thickness of the material of the valve seat and increase the diameter of an intake/exhaust port of the cylinder head. Hence, this technique greatly improves the degree of freedom of engine design.

However, it is known to those skilled in the art that the bonding surfaces of a light-alloy-based cylinder head and an Fe-based valve seat are fragile. Consequently, these bonding surfaces may be deficient in strength as bonding surfaces of these two members required to have high durability.

SUMMARY OF THE INVENTION

It is, therefore, an object of the present invention to provide a metal welding method and metal bonding structure which bond metal members differing in melting point with high bonding strength.

That is, a metal welding method of welding a first metal member (3) and a second metal member (2) having a lower melting point than that of the first metal member is characterized by comprising the steps of depositing a third metal member (7) having high reactivity to the first and second metal members on at least one of the first and second metal members, and heating and pressing the first and second metal members on at least one of which the third metal member is deposited, thereby welding the first and second metal members by a ternary bonding layer (10) containing the first to third metal members.

Also, the metal welding method is characterized in that when the first and second metal members are welded, the third metal member is discharged from the contact portion of the first and second metal members, and the ternary bonding layer is formed in the contact portion.

To achieve the above object, a metal bonding structure according to the present invention is characterized in that a first metal member (3) and a second metal member (2) having a melting point lower than that of the first metal member are bonded via a ternary bonding layer (10) containing the first and second metal members and a third metal member (7) having high reactivity to the first and second metal members.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 5A to 5D are views showing state transitions of the bonding surfaces of the cylinder head and the valve seat in the first embodiment of the present invention;

FIG. 7 is a graph showing the compositions of the bonding surfaces of the valve seat and the cylinder head in the first embodiment of the present invention;

DETAILED DESCRIPTION OF THE PREFERRED EMBODIMENTS

The present invention will be described in detail below with reference to the accompanying drawings by taking welding of a valve seat to the opening of an intake/exhaust port formed in a cylinder head of an engine as an example. In each embodiment to be described below, so-called electrical resistance welding is employed as a practical means of heating and pressing to weld metals.

[First Embodiment]

<Method of Bonding Metal Members>

First, a method of bonding (welding) metal members in the first embodiment will be described.

Figure 1:
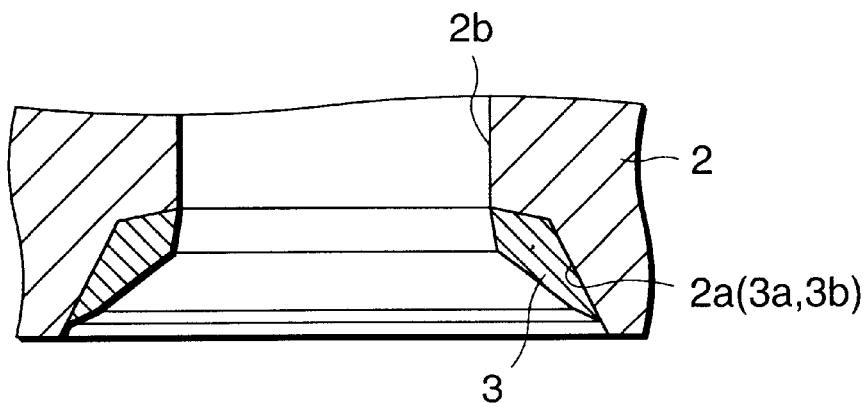
FIG. 1 is a sectional view showing the main components of portions to be bonded in the first embodiment of the present invention.

FIG. 1 is a sectional view showing the main components of portions to be bonded in the first embodiment of the present invention. That is, FIG. 1 shows the opening edge of an intake/exhaust port of a cylinder head 2.

As shown in FIG. 1, a ring-like valve seat (to be referred to as a seat hereinafter) 3 as a first metal member is bonded to a bonding surface 2a (at outer circumferential surfaces 3a and 3b) in the opening edge of an intake/exhaust port 2b of the cylinder head (to be referred to as a head hereinafter) 2 as a member to be welded (a second metal member), i.e., in a position with which a valve (not shown) comes into contact when the engine is complete. The head 2 has a plurality of intake/exhaust ports 2b as shown in FIG. 1 formed into a substantially square shape when viewed from under the head 2. As shown in FIG. 1, the seat 3 is bonded to the opening edge of each port.

The inner circumferential surface of the seat 3 is tapered, in accordance with the shape of a valve upper surface (not shown), such that the diameter decreases upward in FIG. 1.

In this embodiment, the head 2 is a metal member made from an Al-based material as a light alloy material. The seat 3 is a metal member (sintered member) made from an Fe-based material. A Cu-based material as a high-electrical-conductivity material is infiltrated into this seat 3.

Figure 2:
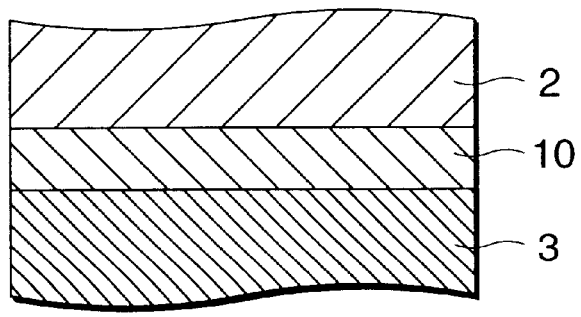
FIG. 2 is an enlarged sectional view showing the structure of the bonding surfaces of a cylinder head and a valve seat in the first embodiment of the present invention.

FIG. 2 is an enlarged sectional view showing the structure of the bonding surfaces of the cylinder head and the valve seat in the first embodiment of the present invention. The header 2 and the seat 3 are metallurgically bonded, by a method to be described below, via a ternary bonding layer (bonding layer 10) about 0.3 $\mu$m thick mainly containing Zn, Al, and Fe.

The method of bonding the head 2 to the seat 3, which realizes the aforementioned bonding structure, will be described in detail below. In a manufacturing process to be described later, the head 2 and the seat 3 are set upside down from the state shown in FIG. 1 by taking the productivity into consideration.

Figure 3:
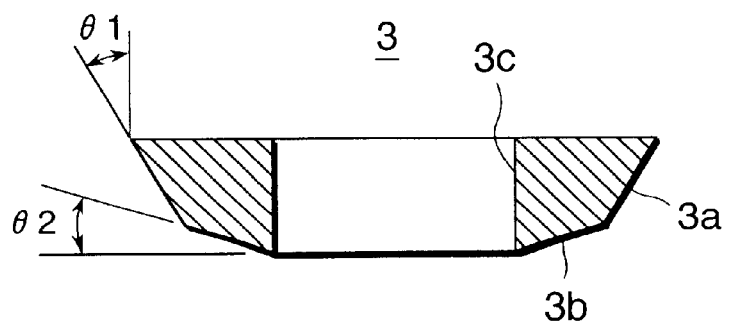
FIG. 3 is a sectional view showing the shape of the valve seat before bonding in the first embodiment of the present invention.

FIG. 3 is a sectional view showing the shape of the valve seat before bonding in the first embodiment of the present invention. As shown in FIG. 3, the outer circumferential surfaces 3a and 3b of the seat 3 are tapered; the outer circumferential surface 3a has an angle $\theta 1$ with respect to the vertical direction and the outer circumferential surface 3b has an angle $\theta 2$ with respect to the horizontal direction. These outer circumferential surfaces 3a and 3b are brought into contact with the opening edge 2a of the head 2 during bonding. An inner circumferential surface 3c of the seat 3 has a different shape from the complete shape shown in FIG. 1 in order to facilitate holding, releasing, and pressing the seat in the manufacturing process (to be described later). The complete shape shown in FIG. 1 is obtained by common grinding and polishing in a post-process (finishing process).

Also, before the seat 3 is bonded to the head 2, a wax layer (wax layer 7), not shown in FIG. 3, is deposited on the outer circumferential surfaces 3a and 3b of the seat 3. This wax layer can be formed by dipping the seat 3 into molten wax and plating the seat 3 in this state by common ultrasonic plating. This wax as a third metal member is a eutectic alloy containing about 95 wt % of Zn and about 5 wt % of a light-alloy-based member (in this embodiment, aluminum), or a eutectic alloy of Cu and a light-alloy-based member such as aluminum. The melting point of the wax layer 7 is lower than those of the seat 3 and the head 2.

In this embodiment, the wax is deposited only on the seat 3. However, the wax can also be deposited on both the head 2 and the seat 3.

The steps of bonding the seat 3 coated with the wax layer to the opening edge 2a of the head 2 by electrical resistance welding will be described below.

Figure 4A:
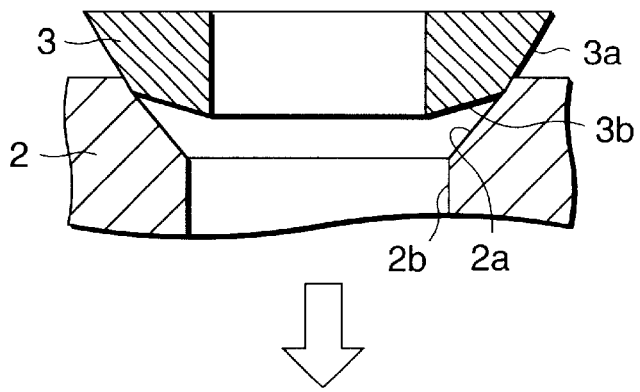
FIGS. 4A to 4C are views for explaining the steps of bonding the cylinder head to the valve seat in the first embodiment of the present invention.
Figure 4B:
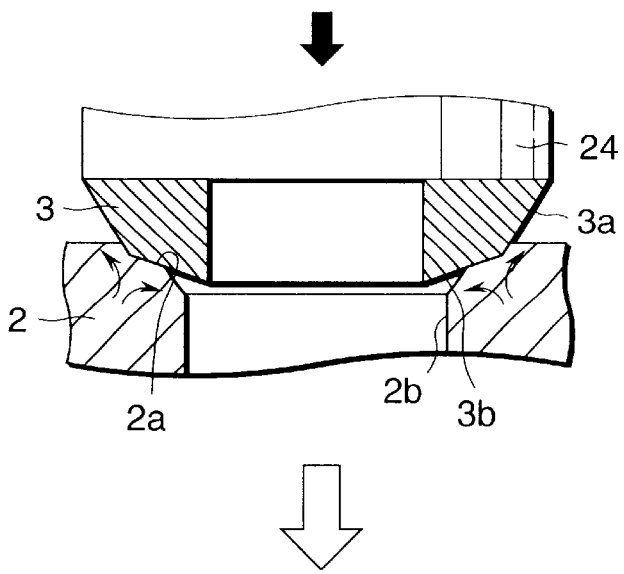
Figure 4C:
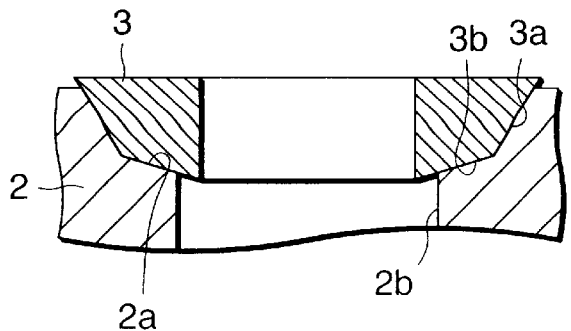

FIGS. 4A to 4C are views for explaining the steps of bonding the cylinder head to the valve seat in the first embodiment of the present invention.

In this embodiment, the opening edge 2a of the head 2 is tapered in order to allow thermal diffusion, occurring between the opening edge 2a and the outer circumferential surfaces of the seat 3 when pressing and electric current application are started, to be as even as possible between the contact surfaces of these two members, i.e., in order to prevent the generation of local heat spots on the head 2 due to a temperature rise by electric current application. In the bonding steps, the seat 3 previously coated with the wax layer is first brought into contact with this tapered opening edge 2a as shown in FIG. 4A.

Next, the seat 3 is pressed as shown in FIG. 4B by a welding electrode (not shown), and an electric current is applied to this welding electrode. Electrical resistance exists between the contact surfaces, i.e., the opening edge 2a and the outer circumferential surfaces 3a and 3b of the seat 3. Therefore, when the electric current is kept applied these contact surfaces are heated. When heating and pressing continue, the seat 3 is welded to the head 2 as it sinks into it as shown in FIG. 4C.

Note that in the manufacturing process to be described later, to more reliably bond the head 2 to the seat 3 the bonding steps shown in FIGS. 4A to 4C are executed underwater or while water is injected near the portions to be bonded (details will be described later).

State transitions of the bonding surfaces of the head 2 and the seat 3 bonded as shown in FIGS. 4A to 4C will be described below with reference to FIGS. 5A to 6D.

FIGS. 5A to 5D are views showing state transitions of the bonding surfaces of the cylinder head and the valve seat in the first embodiment of the present invention. FIGS. 6A to 6D are views schematically showing the compositions of the bonding surfaces of the cylinder head and the valve seat in the first embodiment of the present invention.

Figure 6A:
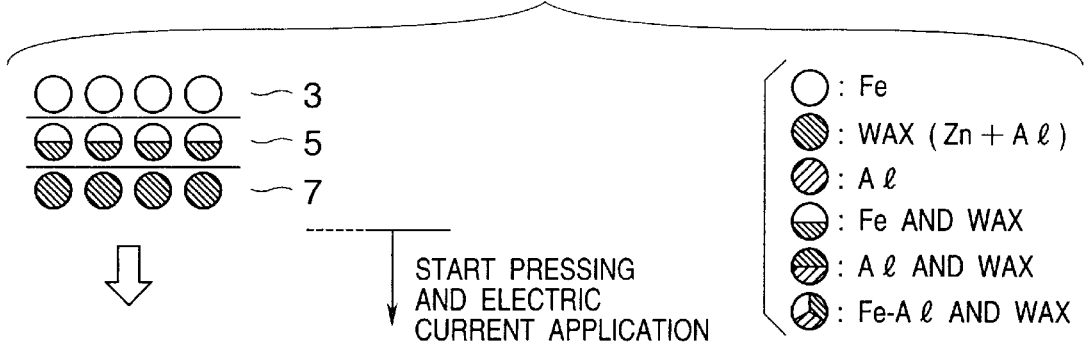
FIGS. 6A to 6D are views schematically showing the compositions of the bonding surfaces of the cylinder head and the valve seat in the first embodiment of the present invention.

FIG. 5A shows the structure of a portion (corresponding to the outer circumferential surfaces 3a and 3b) to be bonded of the seat 3 covered with the eutectic alloy wax layer 7. This wax layer 7 is deposited on the seat 3 via a melting reaction layer 5 having a thickness of 1 μm or less. FIG. 6A shows the composition of the seat 3 covered with the wax layer 7. The melting reaction layer 5 forms a diffusion layer composed of Fe and a wax component diffused from the wax layer 7. That is, the melting reaction layer 5 is an Fe—Zn diffusion layer formed when Zn of the wax layer 7 diffuses toward the valve seat 3.

Next, the seat 3 covered with the wax layer 7 and the head 2 are brought into contact with each other, and electric current application and pressing are started by the welding electrode not shown in FIGS. 5A to 5D. Consequently, as shown in FIG. 5B, the wax layer 7 and the portion (opening edge 2a) to be bonded of the head 2 are bonded via a melting reaction layer 6. This bonds (by liquid phase diffusion bonding) the seat 3 to the head 2 via the melting reaction layers 5 and 6 and the wax layer 7 sandwiched between them. The total thickness of the melting reaction layer 5, the wax layer 7, and the melting reaction layer 6 is preferably about 0.3 to 1.0 μm.

Figure 6B:
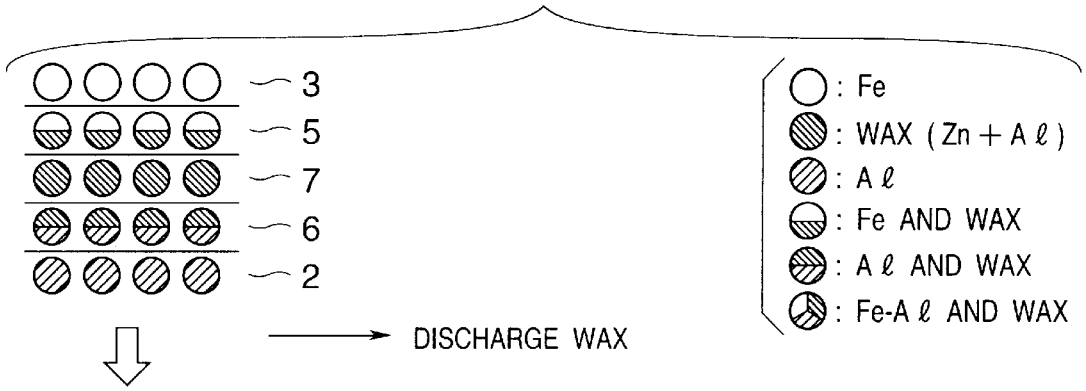

FIG. 6B shows the composition of the bonded portion of the seat 3 and the head 2 in the state shown in FIG. 5B. Since the head 2 is bonded below the wax layer 7 deposited on the seat 3, a diffusion layer (melting reaction layer 6) composed of Al and the wax component diffused from the wax layer 7 is further formed. That is, the melting reaction layer 6 is an Al—Zn diffusion layer formed when the Zn component of the wax layer 7 diffuses in the molten, liquid phase toward the cylinder head 2. The melting point of the wax layer 7 is lower than those of the seat 3 and the head 2.

Details of the diffusion reaction in the state shown in FIGS. 5B and 6B will be described below. In this embodiment the wax layer 7 has a eutectic composition containing about 95 wt % of Zn and about 5 wt % of Al as described above. Hence, the melting point of this wax layer 7 is very low, approximately 380° C., so the wax layer 7 starts melting entirely soon after electric current application is started. When electric current application and pressing continue, the contact surfaces of the seat 3 and the head 2 also start melting. Consequently, as shown in FIG. 4B, the seat 3 is buried in the head 2 as the corner between the bonding surfaces 3a and 3b of the seat 3 plastically fluidizes the fitting surface (opening edge 2a) of the head 2. Accordingly, even when an oxide film is formed on the bonding surface 2a of the head 2, this oxide film can be destroyed by this plastic flow. Also, the Zn component of the melted wax diffuses in the liquid phase toward the head 2 and forms the Al—Zn melting reaction layer 6. This diffusion reaction reduces the ratio of the Zn component (increases the ratio of the Al component) in the wax layer 7 in the portion bonded to the head 2. Therefore, the melting point of the melting reaction layer 6 rises to about 500° C., and as a consequence the melting reaction layer 6 solidifies.

Figure 6C:
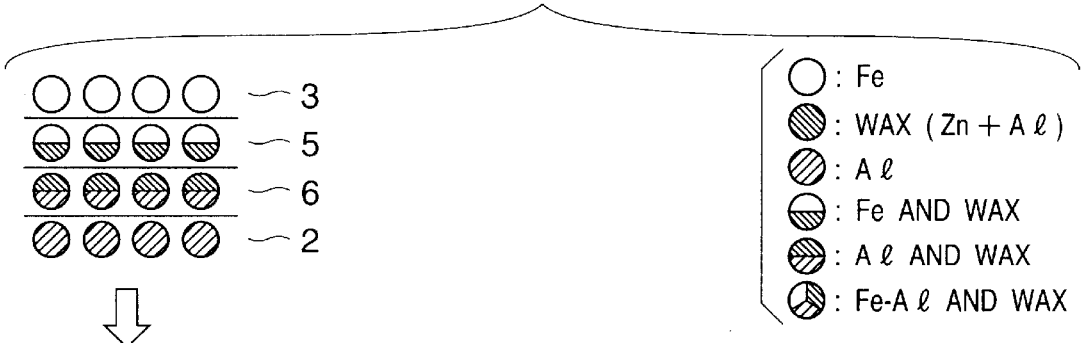

Electric current application and pressing are continued from the state shown in FIGS. 5B and 6B in which the melting reaction layer 6 is formed as described above. Consequently, as shown in FIG. 5C, molten wax of the wax layer 7, i.e., wax which remains unreacted during the formation of the melting reaction layer 6 is discharged from between the bonding surfaces of the seat 3 and the head 2 (between the melting reaction layers 5 and 6), together with components of the oxide film and contaminants peeled from the head 2 by the plastic flow. FIG. 6C shows the composition of the bonded portion of the seat 3 and the head 2 in this state.

Figure 6D:
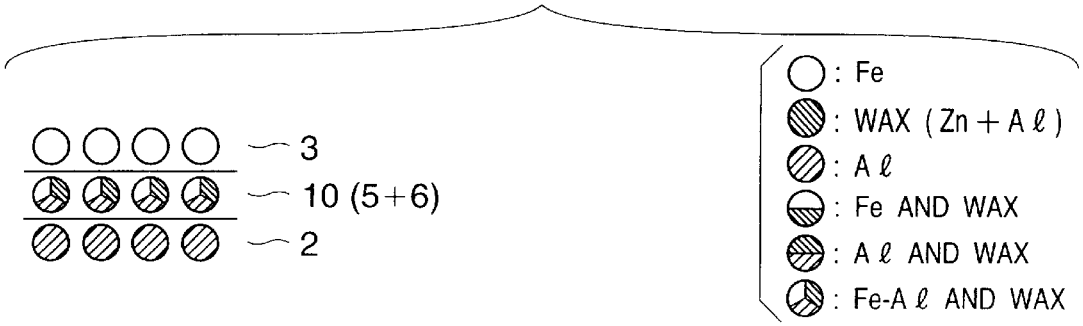
Figure 8:
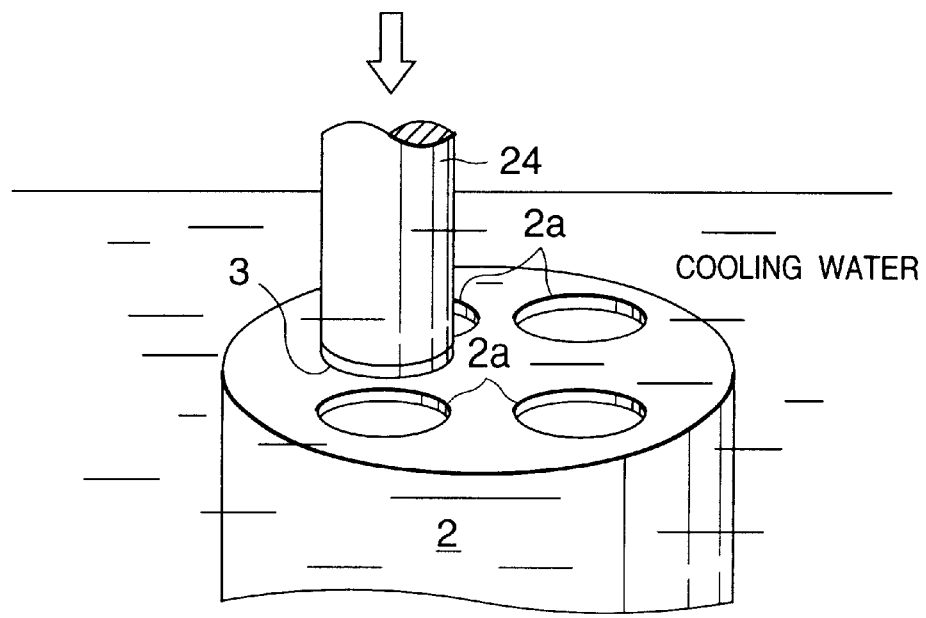
FIG. 8 is a view showing the way the valve seat and the cylinder head are cooled during bonding (when they are bonded underwater) in the first embodiment of the present invention.
Figure 9:
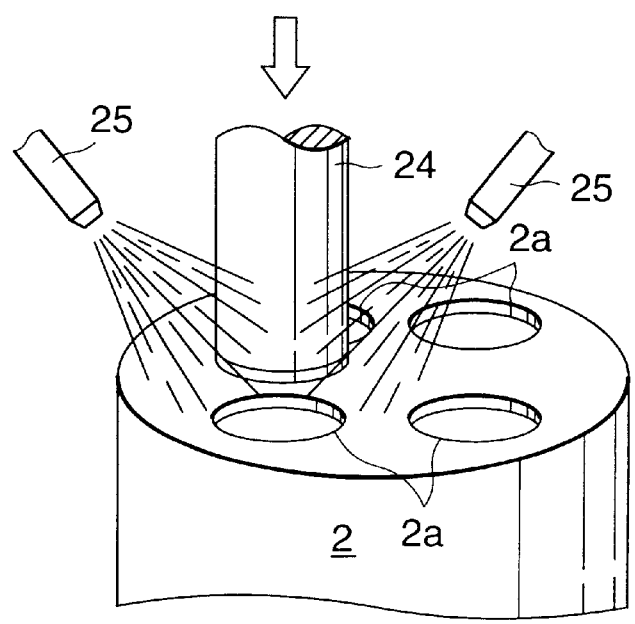
FIG. 9 is a view showing the way the valve seat and the cylinder head are cooled during bonding (when water is injected between the portions to be bonded) in the first embodiment of the present invention.

Electric current application and pressing are further continued from the state shown in FIGS. 5C and 6C in which the wax layer 7 is discharged as described above. Consequently, a diffusion reaction occurs between the two reaction layers (diffusion layers), i.e., the melting reaction layer 5 of the seat 3 and the melting reaction layer 6 of the head 2. As a result, a bonding layer 10 shown in FIG. 5D is formed. FIG. 6D shows the state in which this bonding layer 10 is formed. An alloy layer containing three elements, Fe, Al, and Zn, constructing the melting reaction layers 5 and 6 is formed between the seat 3 and the head 2.

FIG. 7 is a graph showing the compositions of the bonding surfaces of the valve seat and the cylinder head in the first embodiment of the present invention. The abscissa represents the vertical position with respect to the bonding surfaces. The ordinate represents the component ratio of each individual metal material (note, FIG. 7 is not a graph showing the relationship between the actual contents of the metal materials of the bonding surfaces).

As shown in FIG. 7, the bonding layer 10 is formed between the seat 3 and the head 2. In this bonding layer and its vicinity, the alloy layer containing three elements Fe, Al, and Zn is formed. Referring to FIG. 7, Cu is contained to be infiltrated into pores of the seat 3 as a sintered material.

In the bonding method according to this embodiment as described above, the seat 3 and the head 2 are metallurgically welded by the bonding layer 10 with no intervention of the wax layer 7. This prevents the production of Fe—Al, a fragile intermetallic compound, between the bonding surfaces of the seat 3 and the head 2. That is, the bonding strength between the seat 3 and the head 2 can be extremely increased by the bonding layer 10 as a ternary alloy layer which is formed by a diffusion reaction of Fe, Al, and Zn.

In this embodiment, ultrasonic plating is performed so that the thickness of the wax layer 7 deposited on the seat 3 and the melting reaction layer 5 is 1 μm or less. This prevents excess diffusion of the Fe component from the seat 3 to the wax layer 7 when the melting reaction layer 5 is formed, and thereby prevents the composition of the wax components contained in the melting reaction layer 5 formed from largely deviating from the original eutectic composition, or its nearby composition, of the wax layer 7. This also prevents the wax components deviating from the eutectic composition, or its nearby composition, from being contained in large amount in the melting reaction layer 5. The reason for this will be described in more detail below. The melting point of the Al-based head 2 is generally lower than that of the Fe-based seat 3. Hence, to weld the seat 3 with the head 2 without destroying the head shape, welding must be performed within as short time as possible. In this embodiment as described above, even after the melting reaction layer 5 is formed between the seat 3 and the wax layer 7, the composition of the wax components contained in this reaction layer can be maintained as the original eutectic composition or its nearby composition. Therefore, when the seat 3 is bonded to the head 2 it is possible to minimize the input heat amount for melting the wax layer 7 and bond the two members within short time. Accordingly, it is possible to suppress deformation of the seat 3 and softening of the head 2 and effectively enhance the oxide film destroying effect and the wax discharging effect.

Also, in this embodiment, when the seat 3 and the head 2 are bonded the wax components of the wax layer 7 diffuse toward the head 2 and form the melting reaction layer 6. Since this raises the melting point of this reaction layer to about 500° C. or more, the melting reaction layer 6 has a heat resistance higher than the melting point of the wax used after the completion of bonding.

Additionally, in this embodiment the Cu-based material having high electrical conductivity is infiltrated into the seat 3. Hence, pores of the seat 3 as a sintered material are filled with this Cu-based material. This prevents the pores from collapsing upon pressure during bonding. Consequently, it is possible to efficiently plastically fluidize the bonding surface 2a of the head 2, suppress heat generation in the seat 3 by electric current application, and melt and discharge the wax layer 7.

Furthermore, in this embodiment the seat 3 and the head 2 are bonded underwater, or while water is injected (sprayed) near the portions to be bonded, as will be described later. When the two members are bonded while injecting water, water injected near the portions to be bonded boils to form bubbles as an electric current is applied to the welding electrode. Since, however, the wax layer 7 is previously formed on the surface of the seat 3 as described above, the formed bubbles can be pushed together with the melted wax. Consequently, the formation of blow holes (bubbles) in the bonding layer 10 after solidification can be readily prevented.

(Cooling of Portions to be Bonded)

The effect of cooling when the seat 3 and the head 2 are bonded will be described below.

In this embodiment, when the seat 3 and the head 2 are bonded by the aforementioned bonding method, they are bonded underwater, or by injecting water near the portions to be bonded, in order to cool the vicinity of the bonding surfaces with water as a coolant. Characteristic effects described below can be obtained by bonding while cooling the seat 3, the head 2, and a welding electrode 24.

That is, cooling at least the head 2 with cooling water allows the water in contact with the head 2 to directly function as a coolant for controlling the temperature of the head 2. Therefore, compared to a method in which bonding is performed in air in which the temperature of a bonding surface is difficult to control, an excess temperature rise of the head 2 can be prevented, and the bonding surface bonding process can be readily controlled to an optimum state. That is, it is possible to prevent unnecessary plastic deformation of the head 2 having a lower melting temperature (point) than that of the seat 3 and bond the seat 3 to the head 2 with optimum strength. In a mass-production process, variations in the quality of portions to be bonded can be suppressed.

By also cooling the seat 3 during bonding, it is possible to prevent the seat 3 having a very small volume and a small heat capacity compared to the head 2 from being excessively and rapidly heated to a high temperature before being bonded to the bonding surface 2a of the head 2. This can naturally prevent deformation of the seat and prevent hardening resulting from a temperature reduction after the completion of electric current application.

Furthermore, by also cooling the welding electrode 24 during bonding, a large temperature change of the electrode itself due to bonding, which is a principal cause of electrode deterioration, can be reduced by the cooling water. Consequently, it is possible to suppress burrs produced in the bonded portion of the seat 3 and the head 2 and wear of the Cu welding electrode 24 caused by its alloying. This enables the use of one welding electrode for long time periods in a mass-production process. Also, since the cooling water is present between the welding electrode 24 and the head 3, it is possible to prevent aluminum on the bonding surface 2a melted by electric current application from scattering from the bonded portion. Hence, deposition of the scattered aluminum near the end portion of the electrode 24 can be prevented.

When the seat 3 and the head 2 are bonded underwater, no water passage need to be formed in the welding electrode to cool the electrode. Therefore, a mechanism for holding the seat 3 can be provided in the electrode 24 as will be described later. This improves the mass productivity.

<Metal Bonding Apparatus>

A metal bonding apparatus (ring member welding apparatus) for bonding the seat 3 to the head 2 as described above will be explained below. In the following explanation, the overall arrangement of this metal bonding apparatus, an operation control procedure during welding, methods of electric current application and pressing during welding, and a holding apparatus for holding the seat 3 will be described in this order.

(Overall Arrangement of Metal Bonding Apparatus)

Figure 10:
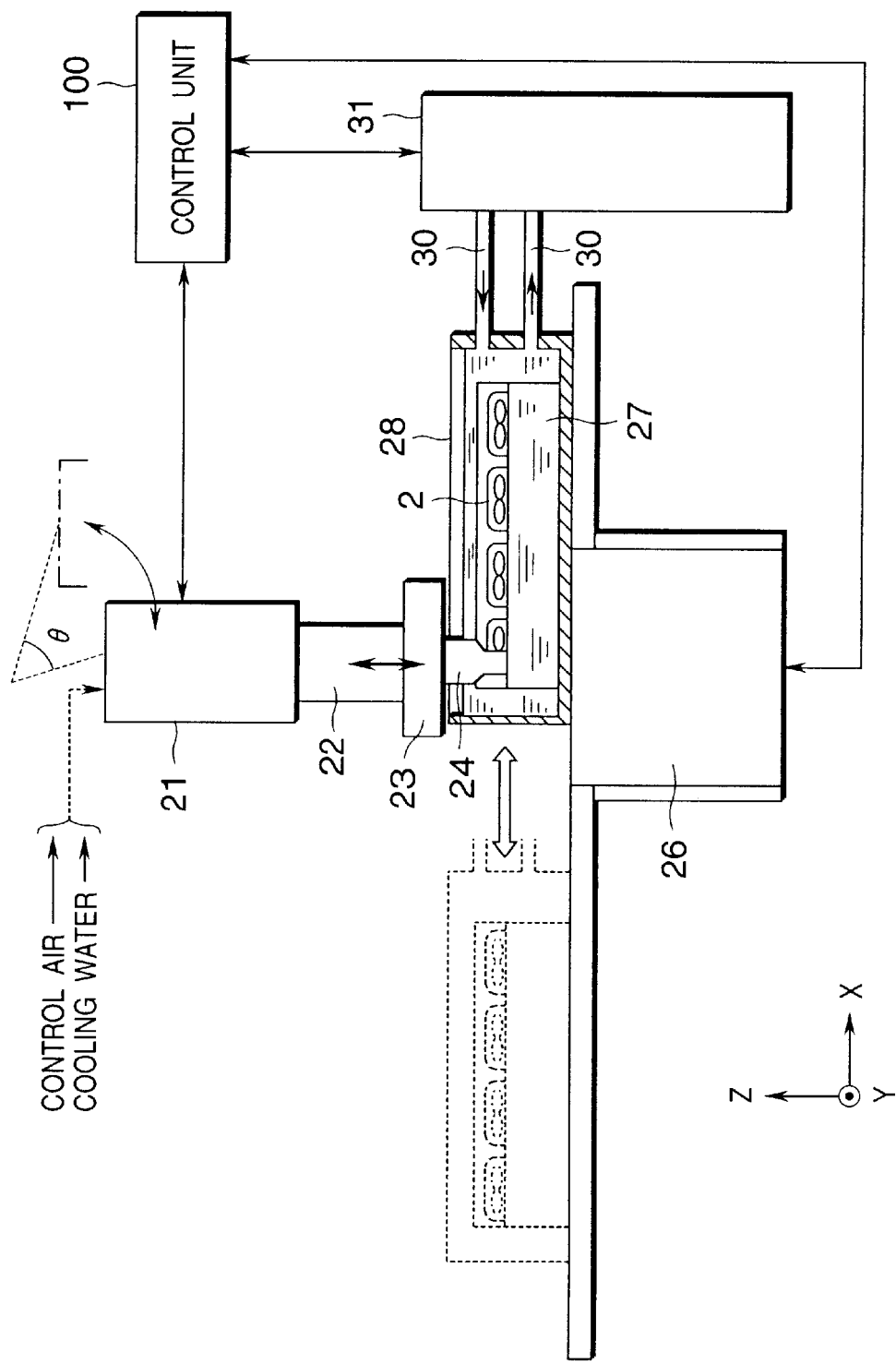
FIG. 10 is a view showing the system configuration of a metal bonding apparatus in the first embodiment of the present invention.

FIG. 10 is a view showing the system configuration of the metal bonding apparatus in the first embodiment of the present invention.

The metal bonding apparatus shown in FIG. 10 is roughly constructed of an electrical resistance welding unit 21, an X-Y stage 26, a cooling water temperature control-circulation control unit 31, and a control unit 100. This control unit 100 controls the operations of these components. Assume that position detection when each component moves and operation control itself of each component are performed using general methods. Therefore, operation control of the overall system will be principally described below.

The electrical resistance welding unit 21 can move the welding electrode 24 attached via a platen 23 in a Z direction shown in FIG. 10 by using a pressure cylinder 22, and can also pivot the welding electrode 24 by using an arm (not shown). The welding electrode 24 has a mechanism for holding and releasing the seat 3 (details of this mechanism will be described later).

More specifically, when a welding process is started the electrical resistance welding unit 21 moves the welding electrode 24 to a seat supply position (not shown) and holds the seat 3 in this position. The electrical resistance welding unit 21 moves the welding electrode 24 to a welding position (opening edge 2a) of the head 2 as an object while holding the seat 3, and welds by electrical resistance the seat 3 to that position.

The X-Y stage 26 can move a water tank 28 filled with cooling water in X and Y directions shown in FIG. 10. More specifically, prior to the start of the welding process the X-Y stage 26 moves the water tank 28 to a predetermined position (container loading-unloading position) indicated by the broken lines in FIG. 10. In this position, a container 27 in which a plurality of heads 2 are set is loaded into the water tank 28 by a loader/unloader (not shown). After that, the X-Y stage 26 moves the water tank 28 to a predetermined welding start home position (H.P). Note that the container 27 includes a metal member (not shown) for applying an electric current, which makes a pair with the welding electrode 24.

When the welding process is started, whenever the electrical resistance welding unit 21 completely welds one seat 3 the X-Y stage 26 moves the water tank 28 such that the next welding position (opening edge 2a) of the head 2 as an object comes to a position immediately below the welding electrode 24. When the seats 3 are welded to all the heads 2 in the container 27, the X-Y stage 26 again moves the water tank 28 to the predetermined position indicated by the broken lines in FIG. 10.

The cooling water temperature control-circulation control unit 31 circulates cooling water in the container 27 on the X-Y stage 26 through a flexible cooling water circulating pipe 30. The cooling water temperature control-circulation control unit 31 also controls the temperature of the cooling water to maintain the cooling water at a predetermined temperature.

(Operation Control Procedure During Welding)

Operation control performed by the control unit 100 will be described below. As this control unit 100, a computer or a PLC (programmable controller) can be used. It is only necessary to allow a CPU (not shown) of such a control device to execute software for realizing a control procedure shown in FIGS. 11 and 12.

Figure 11:
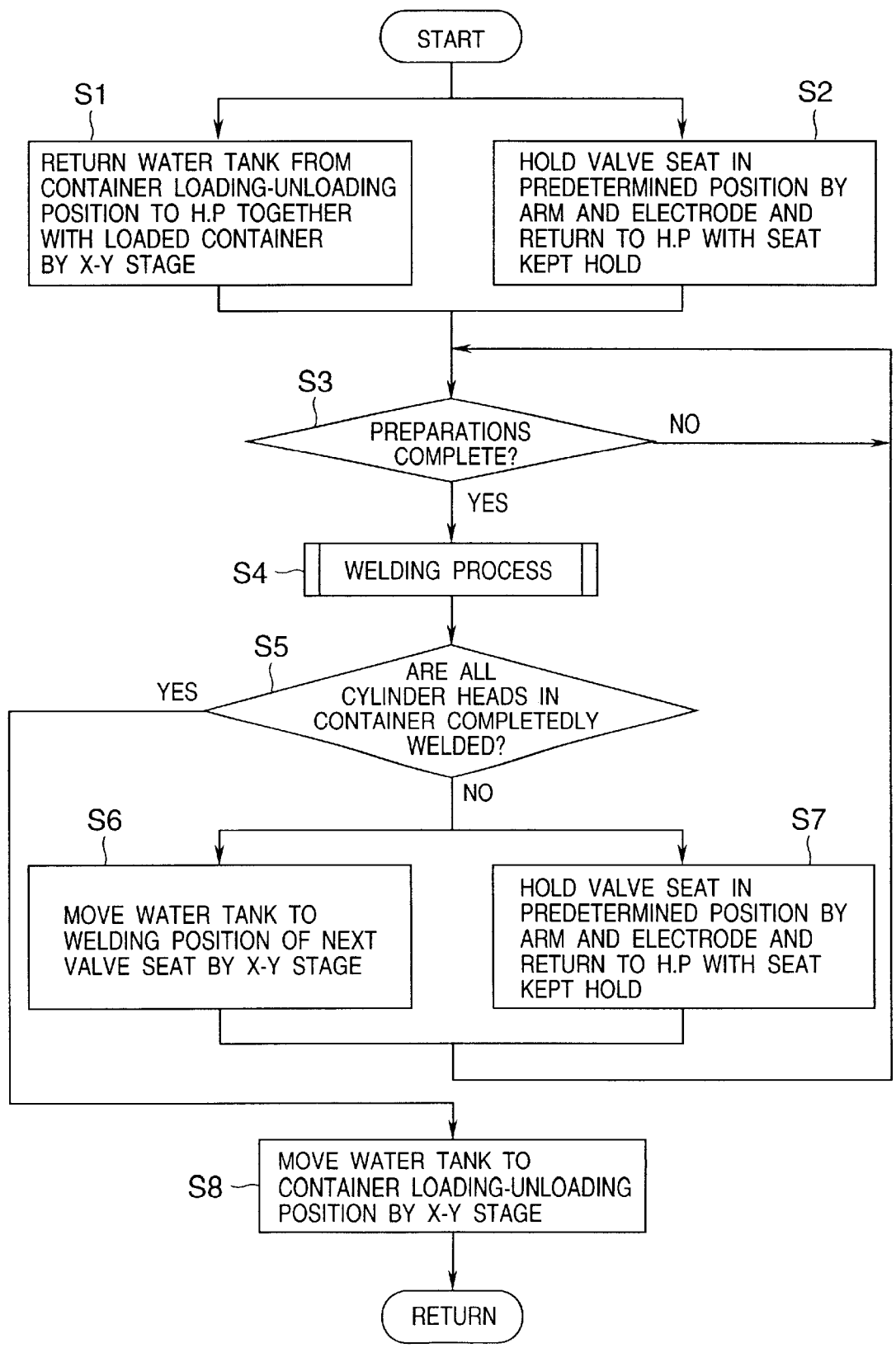
FIG. 11 is a flow chart showing the operation control procedure of the metal bonding apparatus in the first embodiment of the present invention.

FIG. 11 is a flow chart showing the operation control procedure of the metal bonding apparatus in the first embodiment of the present invention. The control unit 100 prestores the H.P and seat supply position of the welding electrode 24, the H.P and container loading·unloading position of the X-Y stage 26, and position information for placing the opening edge 2a of each of a plurality of heads 2 in the container immediately below the welding electrode 24. Note that these pieces of information can also be stored in the electrical resistance welding unit 21 and the X-Y stage 26.

Referring to FIG. 11, steps S1 and S2: The control unit 100 controls the X-Y stage 26 to return the water tank 28 mounting the container 27, which is in the container loading·unloading position indicated by the broken lines in FIG. 10, to the preset H.P (step S1). Also, the control unit 100 controls the electrical resistance welding unit 21 so that the welding electrode 24 holds the seat 3 in this seat supply position and returns to the preset H.P while holding the seat (step S2).

Step S3: The control unit 100 checks whether preparations for performing welding are complete, i.e., whether the water tank 28 mounting the container 27 and the welding electrode 24 have returned to their respective H.Ps.

Step S4: If YES in step S3 (if the preparations have been completed), the control unit 100 executes a welding process to be described later with reference to FIG. 12.

Step S5: The control unit 100 checks whether the seats 3 are completely welded to the opening edges 2a of all the heads 2 in the container 27. If YES (complete) in step S5, the flow advances to step S8; if NO (unprocessed opening edges 2 exist) in step S5, the flow advances to steps S6 and S7.

Steps S6 and S7: If NO in step S5, in accordance with the prestored position information the control unit 100 controls the X-Y stage 26 to move the water tank 28 to the opening edge 2a to be welded next of the head 2 in the container 27 (step S6). Also, the control unit 100 controls the electrical resistance welding unit 21 so that the welding electrode 24 holds the seat 3 in this seat supply position and returns to the H.P of the welding electrode 24 while holding the seat (step S7). When the processes in steps S6 and S7 are complete, the flow returns to step S3.

Step S8: If YES in step S5, this indicates that the seats 3 are bonded to all the heads 2 in the container 27. Therefore, the control unit 100 controls the X-Y stage 26 to move the water tank 28 to the container loading·unloading position, and returns.

After that, the container 27 completely subjected to the welding process is unloaded from the water tank by the loader/unloader (not shown). In a finishing step, the inner circumferential surfaces and upper surfaces of the seats 3 are subjected to a general cutting process to obtain the complete shape shown in FIG. 1.

Figure 12:
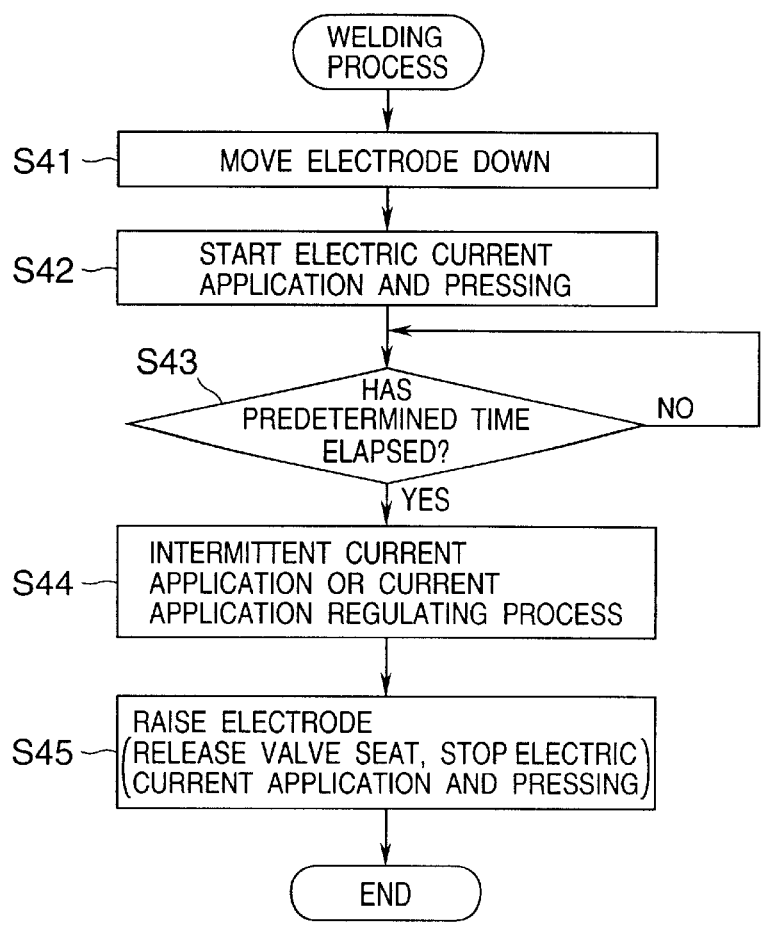
FIG. 12 is a flow chart showing details of a welding process included in the operation control procedure in the first embodiment of the present invention.

FIG. 12 is a flow chart showing details of the welding (electrical resistance welding) process included in the operation control procedure in the first embodiment of the present invention. FIG. 12 corresponds to step S4 in FIG. 11.

Referring to FIG. 12, step S41: The control unit 100 controls the pressure cylinder 22 of the electrical resistance welding unit 21 to move the welding electrode 24 holding the seat 3 down in the Z direction.

Step S42: When the opening edge 2a to be welded this time is brought into contact with the seat 3 by the descent of the welding electrode 24, the control unit 100 allows the electrical resistance welding unit 21 to start electric current application and pressing.

Steps S43 and S44: When a predetermined time has elapsed after electric current application and pressing are started (step S43), the control unit 100 controls the electrical resistance welding unit 21 to perform an intermittent current application process or a current application regulating process (to be described later) while the pressing action is continued (step S44). The predetermined time herein mentioned is a time required for the seat 3 and the head 2 to complete metallurgical melt bonding as described earlier. This predetermined time is preset.

Step S45: After performing the intermittent current application process or the current application regulating process for a predetermined period, the control unit 100 controls the electrical resistance welding unit 21 to raise the welding electrode 24 so as to terminate the electric current application and pressing. In this state two methods are usable to release the seat 3 held by the welding electrode 24. The first method is to raise the welding electrode 24 after releasing the seat 3. In the second method, the seat 3 is previously held by the welding electrode 24 such that the seat 3 is released by extracting force smaller than the bonding strength with which the seat 3 is bonded to the head 2. When the electrode is raised, the held seat is dynamically released. Which method is to be used can be determined in accordance with the mechanism of the welding electrode 24 (to be described later). However, in a mass-production process in which one cycle must be completed within as short time as possible, the second method which obviates the need to release the seat 3 is preferred.

In this embodiment as described above, the welding electrode 24 has the mechanism for holding the seat 3 and is pivotal together with the arm (not shown). This allows this welding electrode 24 to fetch a new seat 3 to the seat supply position. Additionally, the X-Y stage 26 can sequentially move portions to be welded of a plurality of heads 2 to the predetermined welding position (immediately below the H.P of the welding electrode 24). Therefore, by allowing the control unit 100 to operate the electrical resistance welding unit 21 and the X-Y stage 26 in collaboration with each other on the basis of the common positioning control technique, the seat 3 and the head 2 can be bonded with high accuracy, and high mass productivity can be ensured.

(Methods of Electrical Current Application and Pressing During Welding)

Methods of electrical current application and pressing during welding will be described next.

Figure 13:
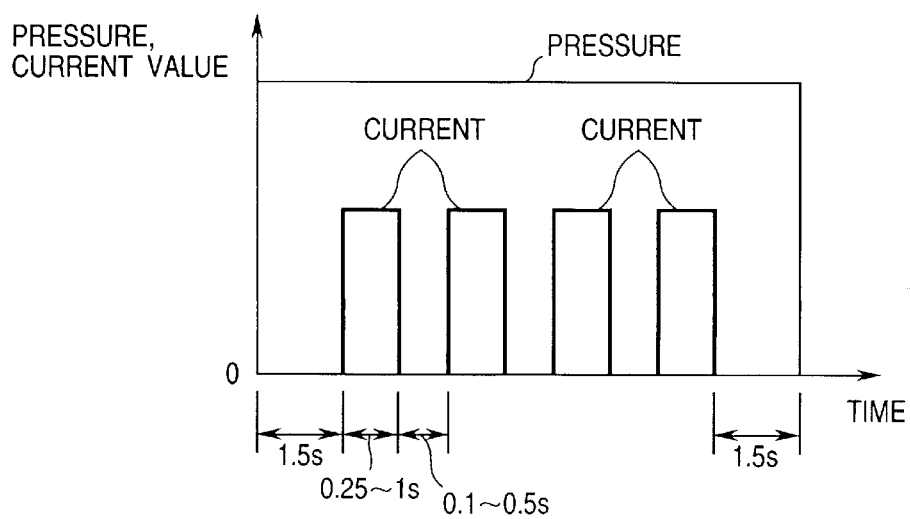
FIG. 13 is a graph showing current application and pressing patterns during electrical resistance welding in the first embodiment of the present invention.
Figure 14:
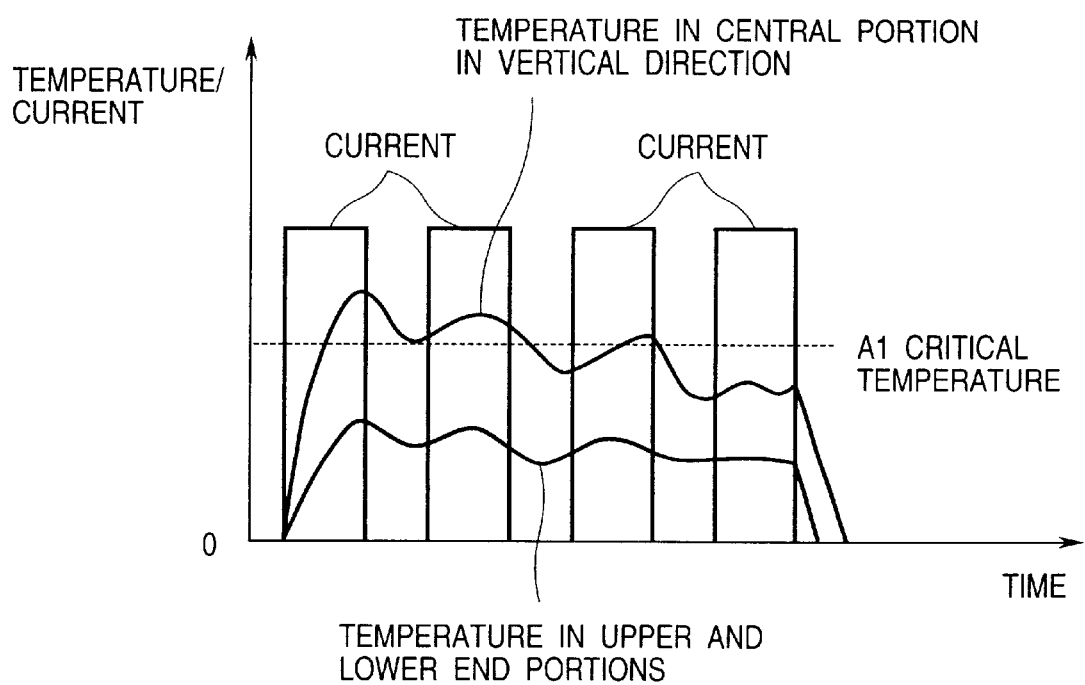
FIG. 14 is a graph showing temperature changes of the cylinder head when the current application pattern of electrical resistance welding in the first embodiment of the present invention is executed.

FIG. 13 is a graph showing current application and pressing patterns during electrical resistance welding in the first embodiment of the present invention. FIG. 14 is a graph showing temperature changes of the cylinder head when the current application pattern of electrical resistance welding in the first embodiment of the present invention is executed.

In this embodiment, current application to the seat 3 and the head 2 is intermittently performed in the form of a pulse (a current of about 70 kA is applied in an ON period of current application, and 0 A is applied in an OFF period) as shown in FIGS. 13 and 14. An electric current is supplied to the welding electrode 24 following this procedure in order to gradually decrease the temperature of the seat 3 after welding is completed, thereby preventing excess curing (so-called hardening) of the seat due to a rapid decrease in the temperature of the seat 3.

These current application and pressing patterns will be described in more detail below. In this embodiment, the welding electrode 24 holding the seat 3 is brought into contact with the head 2, and supply of an electric current is started while the pressure cylinder 22 is applying a pressure. In this state, a predetermined electric current flows from the seat 3 to the head 2. The pressure is desirably about 29,420 N (3,000 kgf). As shown in FIG. 13, while this pressure is held, electric current application is started when about 1.5 seconds have elapsed from the start of pressing, thereby melting the wax layer 7. The current value in this state is desirably about 70 kA. The current application time is 0.25 to 1 sec in the ON period and about 0.1 to 0.5 sec in the OFF period. The number of pulses during electric current application is desirably 3 to 9 (4 in FIGS. 13 and 14). Note that the time from the start of pressing to the start of application of the first current pulse is 1.5 sec, and the time from the stoppage of application of the last pulse to the stoppage of pressing is also 1.5 sec.

FIG. 14 shows temperature changes of the seat 3 when this intermittent current application is performed. Since the heat capacity of the seat 3 made from an Fe material is very small, a temperature rise due to resistance heat generation of the seat 3 is abrupt when an electric current is applied to the seat 3. Especially in a central portion in the vertical direction (thickness direction) of the seat 3, heat is more difficult to radiate than in the upper and lower end portions where heat is easily radiated to the welding electrode 24 or the head 2. In this portion the resistance heat generation amount is also large because the contact resistance between the seat 3 and the head 2 is higher than that after the completion of bonding during the ON period of the first current pulse. Hence, the temperature in this central portion in the vertical direction of the seat 3 is equal to or higher than a critical temperature Al when the application of this first current pulse is stopped.

In this stage, the seat 3 is almost completely buried in the head 2 (FIG. 4C), so electric current application can be completely stopped. If this is the case, however, the seat 3 abruptly cools from the temperature equal to or higher than the transformation temperature Al. Consequently, the central portion in the vertical direction of this seat 3 hardens, resulting in increased hardness of that portion.

In this embodiment, therefore, the second current pulse is applied when the temperature slightly lowers. At this time, metallurgical bonding between the seat 3 and the head 2 is complete, and so the contact resistance reduces unlike when the first current pulse is applied. The resistance heat generation amount reduces in accordance with this reduction of the contact resistance, and heat is radiated from the two members. Accordingly, no large temperature rise takes place even when the value of the second current pulse is the same as the first current pulse. By repeating the same intermittent current application from the third and subsequent current pulses, the seat 3 can be gradually cooled. This results in almost no increase in the hardness of the seat 3. In this embodiment, it is possible by performing this intermittent current application to prevent hardening of the seat 3 and prevent deterioration of the processability when the seat 3 is cut in a finishing process as a post-process. It is also possible to effectively suppress wear of the valve due to excessively high hardness of the valve contact surface of the cut seat 3.

In this embodiment, while the aforementioned intermittent current application is performed the pressing operation is continued with the same pressure from the start of the first pressing. This is to hold the same pressure until the melting reaction layer 6 completely solidifies and cools and to thereby prevent peeling or cracking of the seat 3 and the head 2 at the bonding surfaces due to different thermal expansion coefficients of the two members.

Figure 15A:
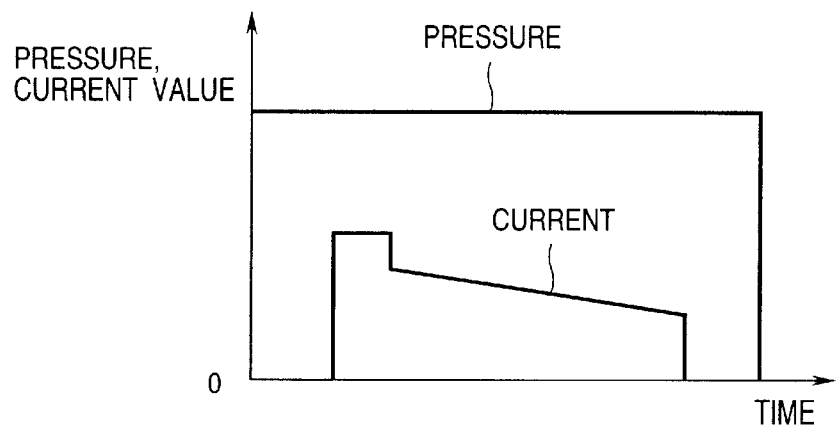
FIGS. 15A to 15C are graphs showing modifications of the current application and pressing patterns of electrical resistance welding in the first embodiment of the present invention.
Figure 15B:
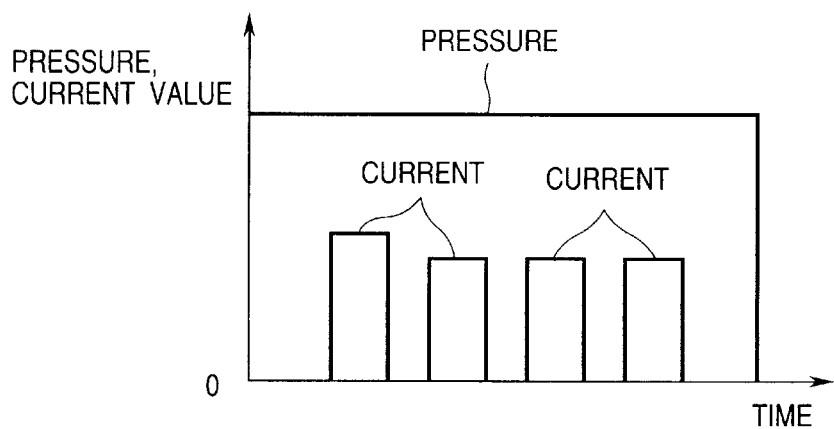
Figure 15C:
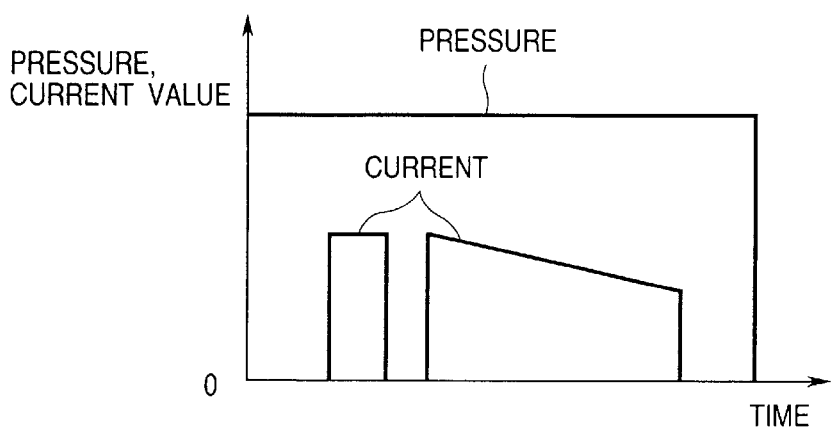

In the abovementioned intermittent current application shown in FIGS. 13 and 14, current pulses having the same pattern are applied a plurality of times. However, the current application mode can also be gradually regulated after the completion of bonding as long as metallurgical bonding between the seat 3 and the head 2 can be completed within the first current application period. More specifically, in a pattern shown in FIG. 15A an electric current to be applied is continuously reduced after metallurgical bonding between the seat 3 and the head 2 is completed. In a pattern shown in FIG. 15B, current application is once stopped after metallurgical bonding between the seat 3 and the head 2 is completed, and then an electric current to be applied is continuously reduced. In a pattern shown in FIG. 15C, after metallurgical bonding between the seat 3 and the head 2 is completed by the first current pulse, current pulses having smaller current values than that of the first current pulse are applied a plurality of times. In any of these patterns shown in FIGS. 15A to 15C, the pressure is a predetermined one as in the case of FIG. 13.

(Seat Holding Mechanism)

Next, the seat holding mechanism of the welding electrode 24 will be described. In this embodiment, the welding electrode 24 has the holding mechanism capable of holding the seat 3 near its end portion. Practical examples are three mechanisms explained below.

Figure 16:
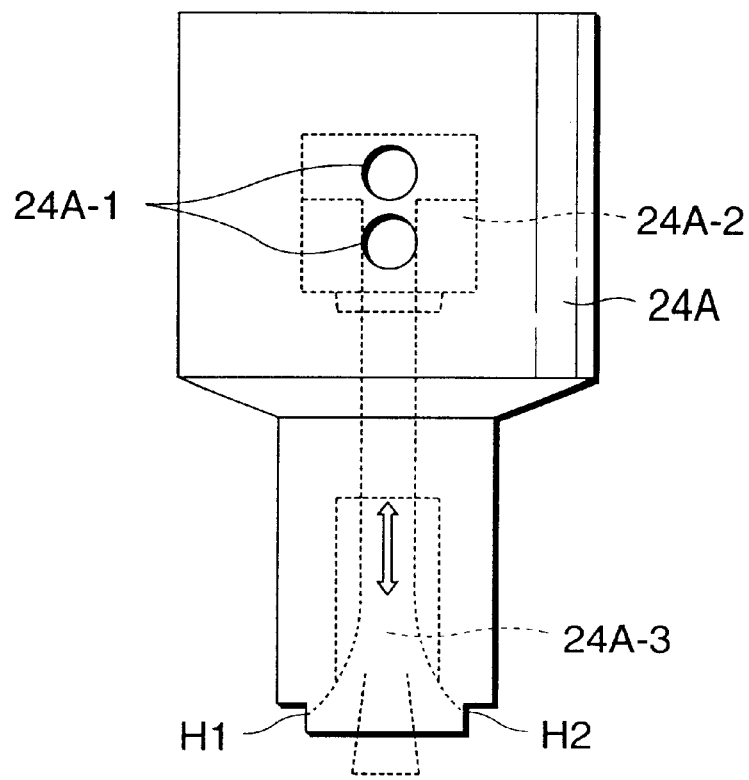
FIG. 16 is a view for explaining the structure of a welding electrode in the first embodiment of the present invention (when a collet chuck is used)
Figure 17:
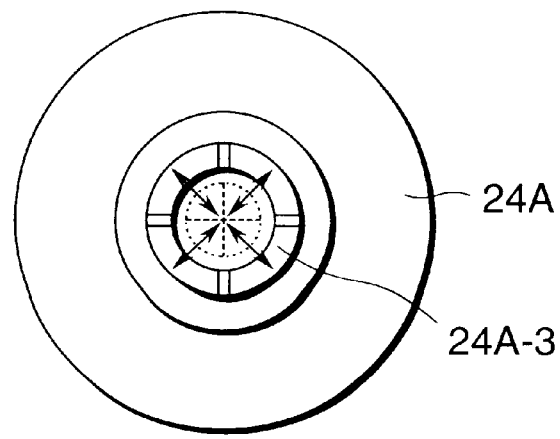
FIG. 17 is a view for explaining the structure of a welding electrode in the first embodiment of the present invention (when a collet chuck is used)

FIGS. 16 and 17 are views for explaining the structure of a welding electrode as the first embodiment of the present invention. This electrode has a collet chuck near its end portion.

Referring to FIGS. 16 and 17, a welding electrode 24A contains a piston 24A-2 and a collet chuck 24A-3. The piston 24A-2 operates in accordance with control air supplied and exhausted through intake/exhaust holes 24A-1. The collet chuck 24A-3 can move in the vertical direction in FIG. 16 with the movement of the piston. When the piston 24A-2 is in the upper dead center, the collet chuck 24A-3 widens across positions H1 and H2 and is capable of holding the seat 3 on its inner circumferential surface. When the piston 24A-2 is in the lower dead center, the end portion of the collet chuck 24A-3 narrows down as indicated by the broken lines in FIGS. 16 and 17, so the collet chuck 24A-3 can release or set the seat 3.

Figure 18:
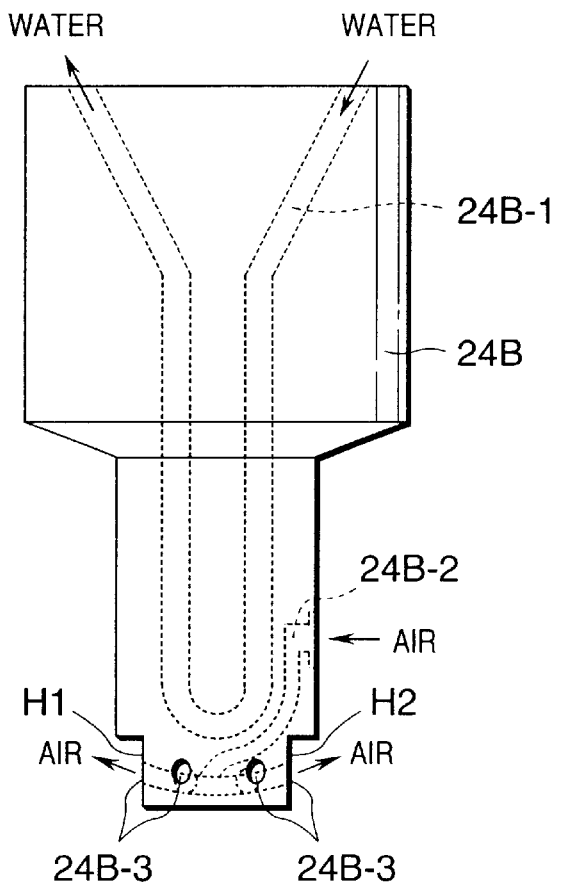
FIG. 18 is a view for explaining the structure of a welding electrode in first embodiment of the present invention (when air is released)
Figure 19:
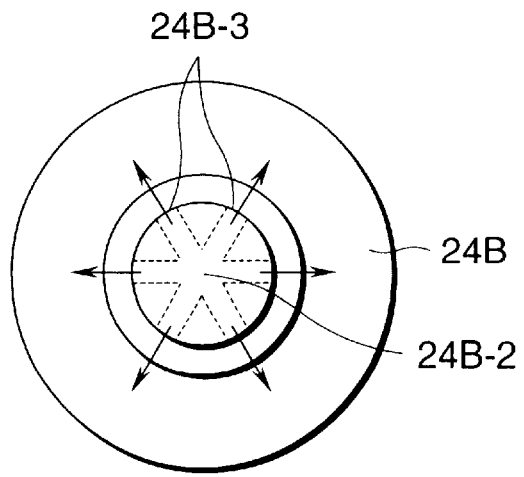
FIG. 19 is a view for explaining the structure of a welding electrode in first embodiment of the present invention (when air is released)

FIGS. 18 and 19 are views for explaining the structure of a welding electrode as the first embodiment of the present invention. In this structure, the seat 3 is held by air released from the vicinity of the end portion of this electrode.

Referring to FIGS. 18 and 19, a welding electrode 24B internally has a water passage 24B-1 for cooling water and a ventilation hole 24B-2 for releasing air from air release ports 24B-3. This welding electrode 24B can hold the seat 3 in positions H1 and H2 by releasing air from the air release ports 24B-3 under the control of the electrical resistance welding unit 21. To release or set this seat, it is only necessary to stop the air release from the air release ports 24B-3.

Note that the water passage 24B-1 can be omitted if the welding electrode 24B is also submerged into cooling water during welding.

Figure 20:
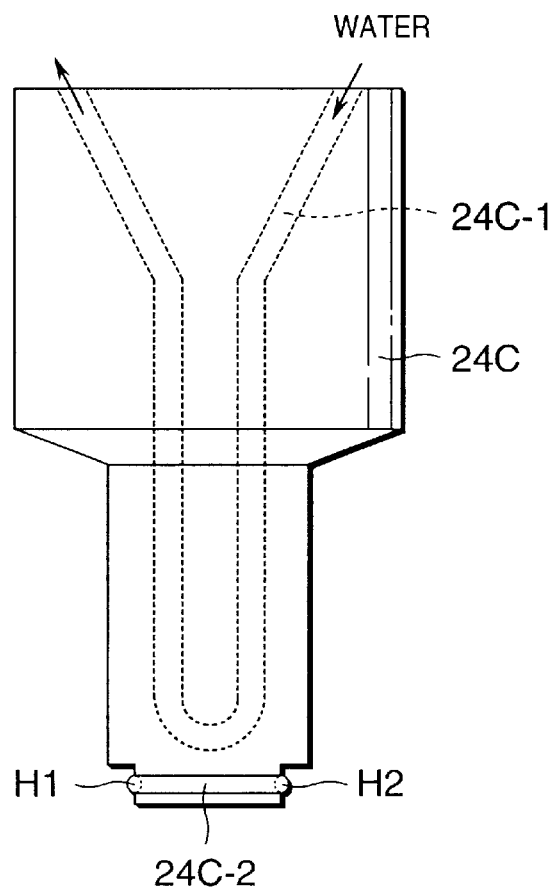
FIG. 20 is a view for explaining the structure of a welding electrode in first embodiment of the present invention (when a suspension ring is used)
Figure 21:
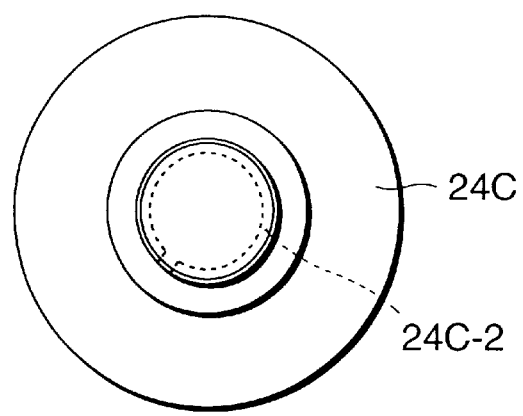
FIG. 21 is a view for explaining the structure of a welding electrode in first embodiment of the present invention (when a suspension ring is used)

FIGS. 20 and 21 are views for explaining the structure of a welding electrode as the first embodiment of the present invention. In this structure, the seat 3 is held by air released from the vicinity of the end portion of this electrode.

Referring to FIGS. 20 and 21, a suspension ring 24C-2 is attached to the end portion of a welding electrode 24C. The seat 3 can be held in positions H1 and H2 by giving tension to the inner surface of the seat 3 by the restoring force of this suspension ring. This structure does not require any special control operation for releasing and setting the held seat 3.

A water passage 24C-1 for cooling water is formed inside the welding electrode 24C. This water passage 24C-1 can be omitted if the welding electrode 24C is also submerged into cooling water during welding.

As the welding electrode 24 according to this embodiment, any of the welding electrodes 24A to 24C can be used. When the welding electrode 24A is used, however, an operation of releasing the seat 3 must be performed when this electrode is raised in step S45 of the welding process shown in FIG. 12. When the welding electrode 24B is used, the seat 3 can be released by stopping air supply to the ventilation hole 24B-2. In this state, however, the seat 3 is bonded to the head 2. Therefore, an operation of releasing the seat 3 prior to elevation of the welding electrode 24B can be omitted by supplying air with which the seat 3 is held by strength weaker than the bonding strength. When the welding electrode 24C is used, the held seat 3 can be dynamically released by the rising action of the electrode by using the suspension ring 24C-2 having holding force weaker than the bonding strength between the seat 3 and the head 2.

As described above, this embodiment realizes a metal bonding apparatus which can weld the seat 3 and the head 2 within short time period with high bonding strength and can readily realize this welding method in a mass-production process. This remarkably decreases the size and thickness of a valve seat compared to a common method by which a valve seat is press-fitted in a cylinder head. Accordingly, it is possible to use a structure in which the intervals between adjacent intake/exhaust ports of the same cylinder head are constricted or the throat diameter is increased. This can improve the performance, reliability, and degree of freedom of design of an engine.

In the first embodiment, the two different tapers 3a and 3b are formed on the outer circumferential surface of the seat 3. However, to facilitate heat diffusion produced between the opening edge 2a and the outer circumferential surface of the seat 3 by electric current application, a tapered surface formed on the opening edge 2a of the head 2 and a tapered surface formed on the outer circumferential surface of the seat 3 can also be entirely brought into contact with each other.

In this embodiment, the seat 3 is manufactured by sintering, and a Cu-based material is infiltrated into this sintered seat 3. However, no Cu-based material needs to be infiltrated if the seat 3 has certain internal density. Also, internal pores of the seat 3 can be eliminated by forming the seat 3 as a sintered forged product obtained by forging the seat 3 after it is sintered.

In this embodiment, heating to a temperature equal to or higher than the melting point of the wax component of the wax layer 7 is performed by heat generated when an electric current is applied between the seat 3 and the head 2, thereby melting the wax layer 7. However, the wax layer 7 can also be melted by local heating such as radio-frequency heating.

In this embodiment, the wax is a Zn—Al eutectic alloy containing 95 wt % of Zn. However, this wax can also be a Zn—Al-based alloy having a eutectic composition or its nearby composition (e.g., the content of Zn is 92 to 98 wt %). When this is the case, the melting point of the wax layer 7 can be decreased to 400° C. or less. This makes it possible to more reliably prevent deformation of the seat 3 and melting, or softening, of the head 2 and thereby effectively improve the bonding strength between the seat 3 and the head 2.

[Second Embodiment]

In the above first embodiment, the bonding surface 2a of the head 2 is previously tapered. In this second embodiment, however, that portion of a head 2, which is to be bonded to a seat 3 is not tapered but keeps a substantially right-angled edge formed when an intake/exhaust port is formed in the head 2. The rest of the arrangement is the same as in the first embodiment, so a detailed description thereof will be omitted.

Figure 22A:
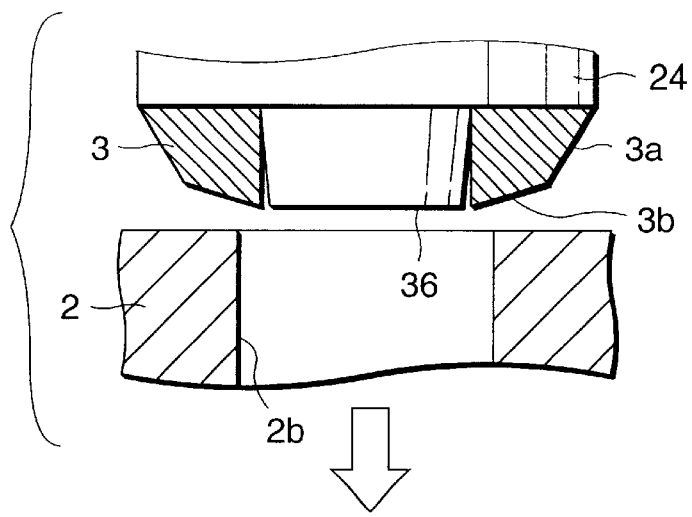
FIGS. 22A to 22C are views for explaining the steps of bonding a cylinder head to a valve seat in the second embodiment of the present invention.
Figure 22B:
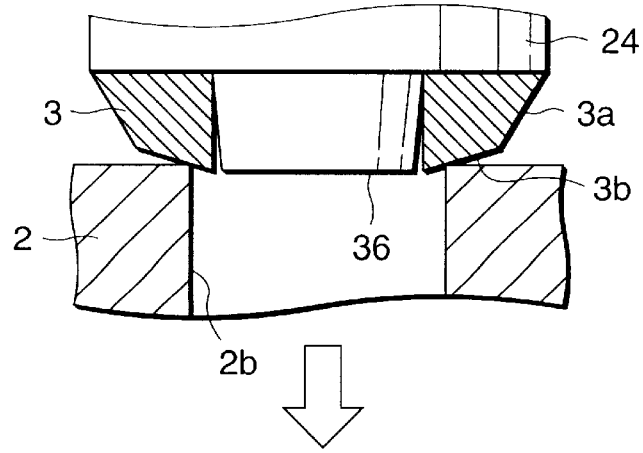
Figure 22C:
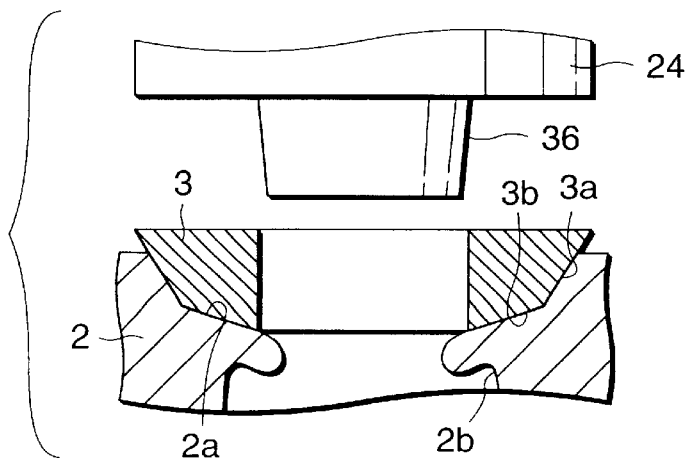

FIGS. 22A to 22C are views for explaining the steps of bonding a cylinder head and a valve seat in the second embodiment of the present invention. Referring to FIGS. 22A to 22C, a seat holding mechanism of a welding electrode 24 is not shown as in FIG. 4.

In this embodiment, as shown in FIG. 22A, that portion of the head 2, which is to be bonded to the seat 3 has a substantially right-angled edge. The seat 3 is brought into contact with the head 2 having this shape, and electric current application and pressing described earlier are performed (FIG. 22B). The seat 3 is buried in the head 2 as the head 2 is plastically fluidized by bonding surfaces 3a and 3b of the seat 3. When fitting is thus completed, the seat 3 is completely buried in the head 2 as shown in FIG. 22C, and metallurgical bonding is complete.

As described above, that portion of the head 2, which is to be bonded to the seat 3 is not tapered but keeps a substantially right-angled edge formed when an intake/exhaust port is formed in the head 2. When the seat is brought into contact with this portion during bonding, heat spots appear in this right-angled portion, and this facilitates local melting. In this embodiment, however, as shown in FIG. 22C, the plastic deformation amount of the head 2 during bonding is larger than that of the head 2 explained in the first embodiment. Therefore, even when an oxide film sticks to this bonding portion, this oxide film can be efficiently removed by plastic deformation of the bonding portion. This prevents adverse effect of the oxide film.

As shown in FIG. 22C, the amount of Al protruding into an intake/exhaust port 2b owing to plastic deformation during bonding is larger than that in the first embodiment. However, this protruding portion can be scraped off in a finishing step which is also performed in the first embodiment. So, no new finishing step of scraping off the protruding portion is necessary. Accordingly, in this embodiment it is possible to weld the seat 3 and the head 2 within short time period with high bonding strength as in the first embodiment. Additionally, compared to the first embodiment the productivity can be improved by omitting the step of forming a taper in the head 2.

In each of the above embodiments, the system configuration is such that the welding electrode 24 moves to a predetermined position to fetch the seat 3. However, it is also possible to move this electrode only in the Z direction and externally supply the seat 3 to the electrode.

Also, the coolant is not limited to water. For example, alkaline ion water has no influence on an Fe seat and achieves an effect of preventing adhesion of an oxide film to the bonding surface (bonding portion) of an Al head. Especially when alkaline ion water having these characteristics is used as a coolant for the head 2 having the taper explained in the first embodiment, it is possible to almost completely prevent adhesion of an oxide film to the surface to be bonded to the seat 3. Hence, alkaline ion water is a particularly effective coolant in that it can prevent adverse effect of an oxide film, although the plastic deformation amount during bonding becomes smaller than that of the head 2 explained in the second embodiment.

As described above, each of the above embodiments can provide a metal welding method and metal bonding structure which bond metal members having different melting points with high bonding strength.

That is, in each of the above embodiments, a ternary bonding layer containing the third metal member described above is formed on the bonding surfaces of the aforementioned first and second metal members. This realizes high bonding strength. An assumed material combination example is that the first metal member is an iron-based member, the second metal member is a light-alloy-based member, and the third metal member is a eutectic alloy containing zinc or copper and a light-alloy-based member.

In each of the above embodiments, when the first and second metal members are bonded that molten portion of the third metal member, which has not reacted with the first and second metal members, can be discharged from the contact portion. Accordingly, high bonding strength can be achieved by two types of diffusion layers containing the third metal member which has solidified by reacting with the first and second metal members.

In the second embodiment described above, a portion of the second metal member where the second metal member is bonded to the first metal member has an edge shape. Therefore, when the first and second metal members are bonded this second metal member largely plastically deforms. Consequently, an oxide film and contaminants can be efficiently removed.

In each of the above embodiments, when the first and second metal members are bonded the second metal member is cooled with water. This makes it possible to prevent unnecessary plastic deformation of the second metal member having a lower melting point than that of the first metal member.

In each of the above embodiments, when the first and second metal members are bonded these first and second metal members are cooled with water. This makes it possible to prevent unnecessary plastic deformation of the second metal member having a lower melting point than that of the first metal member. It is also possible to prevent the first metal member with small heat capacity from being excessively and rapidly heated to high temperature before the first metal member is bonded to the second metal member. This prevents hardening caused by a temperature decrease after the completion of electric current application.

In each of the above embodiments, when the first and second metal members are bonded the electrode is also submerged into water. This suppresses deterioration of the electrode when the first and second metal members are heated and pressed by electrical resistance welding.

As many apparently widely different embodiments of the present invention can be made without departing from the spirit and scope thereof, it is to be understood that the invention is not limited to the specific embodiments thereof except as defined in the appended claims.

What is claimed is:

1. A metal welding method of welding a first metal member and a second metal member having a lower melting point than that of said first metal member, comprising the steps of:

a first step of depositing a third metal member having high reactivity to said first and second metal members on said first metal member via a first diffusion layer composed of said first and third metal members;

a second step of positioning said first and third metal members so that said third metal member is contacted with said second metal member;

a third step of heating and pressing said first to third metal members positioned in said second step by a welding electrode;

a fourth step of, by further continuing the heating and pressing, welding said second and third metal members via a second diffusion layer composed of said second and third metal members;

a fifth step of, by further continuing the heating and pressing, discharging said third metal member which remains unreacted during the formation of said second diffusion layer from between said first and second metal members, and contacting said first and second diffusion layer directly; and a sixth step of, by further continuing the heating and pressing, diffusing said first and second diffusion layer directly contacted in said fifth step and welding, by diffusion reaction caused by the continuation of the heating and pressing, said first and second metal members only by a ternary bonding layer which is composed of said first, second and third metal members.

2. The method according to claim 1, wherein an iron-based member is used as said first metal member, and a light-alloy-based member is used as said second metal member.

3. The method according to claim 2, wherein a eutectic alloy containing one of zinc and copper and a light-alloy-based member is used as said third metal member.

4. The method according to claim 1, wherein a portion of said second metal member, which is to be bonded to said first metal member has an edge shape.

5. The method according to claim 1, wherein, in said first step, said first and third metal members are welded by ultrasonic plating.

6. The method according to claim 1, wherein, when said first and second metal members are welded, at least a vicinity of a portion of said second metal member to be bonded to said first metal member is cooled.

7. The method according to claim 6, wherein, when said first and second metal members are welded, the vicinity of a bonding surface of said second metal member is cooled by an externally supplied coolant.

8. The method according to claim 7, wherein water is used as the coolant.

9. The method according to claim 8, wherein, when said first and second metal members are welded, said second metal member is cooled in the water.

10. The method according to claim 9, wherein, when said first and second metal members are welded, said first metal member is also cooled in the water.

11. The method according to claim 9, wherein, when said first and second metal members are welded, said first and second metal members are heated and pressed by electrical resistance welding.

12. The method according to claim 11, wherein, when said first and second metal members are welded by electrical resistance welding, an electrode for applying an electric current to said first and second metal members is also cooled in the water.

13. The method according to claim 1, wherein a melting point of said third metal member is lower than that of said first metal member and higher than that of said second metal member.

14. A metal bonding structure, in which a first metal member and a second metal member are bonded by the steps of:
- a first step of depositing a third metal member having high reactivity to said first and second metal members on said first metal member via a first diffusion layer composed of said first and third metal members;
- a second step of positioning said welded first and third metal members so that said third metal member is contacted with said second metal member;
- a third step of heating and pressing said first to third metal members positioned in said second step by a welding electrode;
- a fourth step of, by further continuing the heating and pressing, welding said second and third metal members via a second diffusion layer composed of second and third metal members;
- a fifth step of, by further continuing the heating and pressing, discharging said third metal member which remains unreacted during the formation of said second diffusion layer from between said first and second metal members, and contacting said first and second diffusion layer directly;
- a sixth step of, by further continuing the heating and pressing, diffusing said first and second diffusion layer directly contacted in said fifth step and welding, by diffusion reaction caused by the continuation of the heating and pressing, said first and second metal members only by a ternary bonding layer which is composed of said first, second and third metal members.

15. The structure according to claim 14, wherein said first metal member is an iron-based member, and said second metal member is a light-alloy-based member.

16. The structure according to claim 15, wherein said third metal member is a eutectic alloy containing one of zinc and copper and a light-alloy-based member.

17. The structure according to claim 14, wherein a melting point of said third metal member is lower than that of said first metal member.and higher than that of said second metal member.

* * * * *